Patented Oct. 13, 1925.

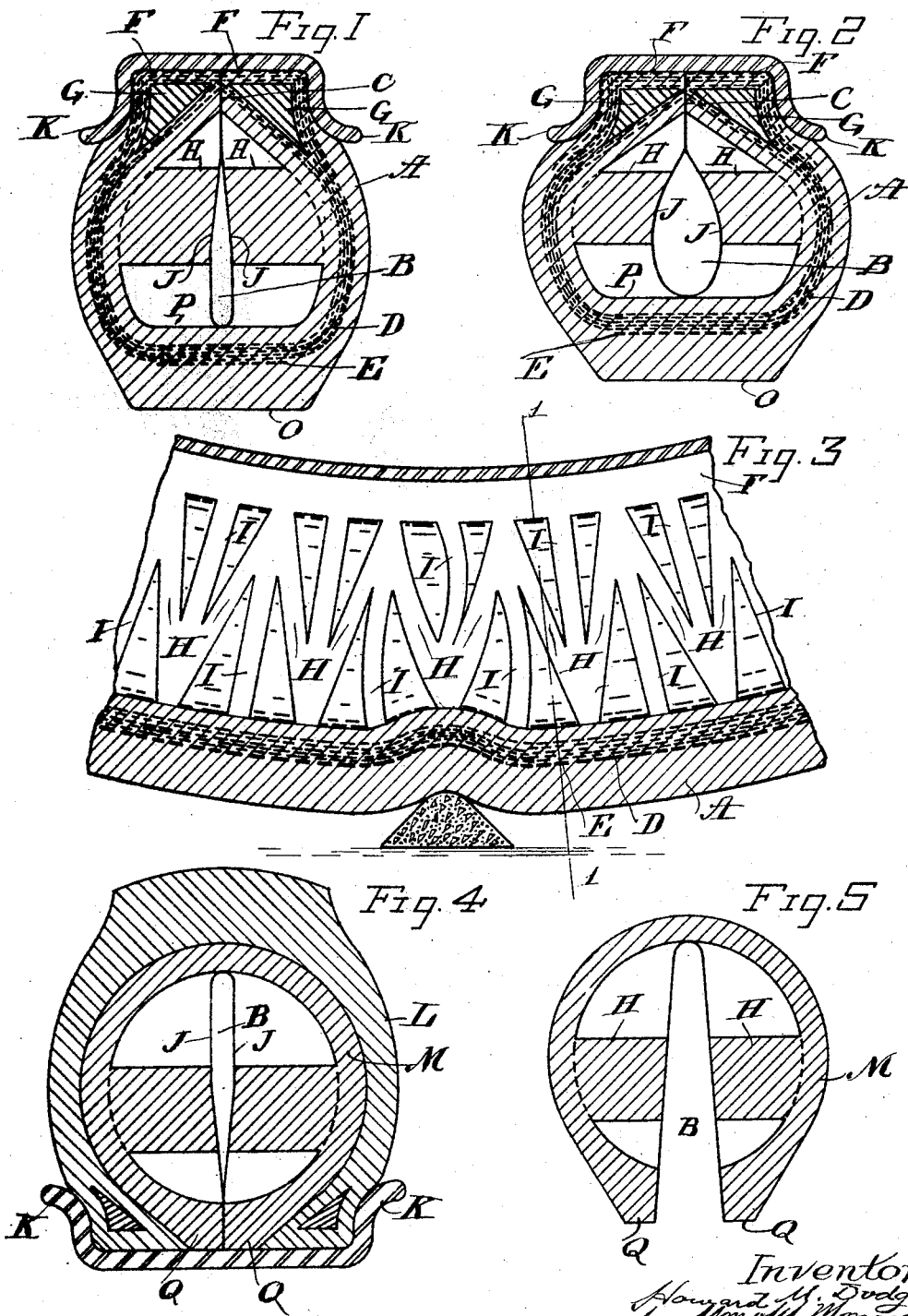

1,557,437

UNITED STATES PATENT OFFICE.

HOWARD M. DODGE, OF AKRON, OHIO.

NONINFLATABLE TIRE.

Application filed July 17, 1922. Serial No. 575,575.

*To all whom it may concern:*

Be it known that I, HOWARD M. DODGE, a citizen of the United States, and resident of Akron, in the county of Summit and State of Ohio, have invented certain new and useful Improvements in Noninflatable Tires; of which I hereby declare the following to be a full, clear, and exact description, such as will enable others skilled in the art to which it appertains to make and use the same.

The objects of this invention are to provide a resilient tire for a pleasure car, truck or other motor-driven vehicle, in which the resiliency is not obtained by inflation with compressed air, but is obtained by making the tire hollow and providing therein a multiple number of resilient shock and strain absorbing members, by means of which the road pressure is absorbed without conveying a shock to the wheel, and also by means of which the pressure is distributed circumferentially in the tire upon each side of the point of impact when the pressure is applied thereto.

These advantages are obtained by constructing the hollow tire, or a hollow inner core for the tire, with transverse internal and oppositely or zigzagging inclined webs, alternating with radial ribs, in which the radial ribs preferably join the webs at their intersecting points.

The invention further includes a hollow tire or core, split circumferentially on its inner or rim side, and provided with oppositely inclined webs and radial ribs alternating therewith, upon its vertical sides, the vertical inner edges of which are normally closely adjacent to or in contact with each other when the tire is secured upon its metal rim.

The rim edges of the hollow tire or core, and the adjacent parts of the webs and ribs are brought into close contact with each other by the flanges of the rim, and the outer portions of the webs and ribs are separated by the action of the hollow body when subjected to road pressure or sudden shock, the amount of yielding of the tread surface of the hollow body depending upon the weight of the car and the velocity of its travel, and the amount of resistance afforded by the structure of the body and thrust or bridging member described.

The device may be constructed as an integral part or tube provided with beaded edges, engageable by the rim flanges, and provided with the usual fabric reinforcement, or it may be constructed in two portions, including a hollow core enclosed in an outer casing of the usual character.

With the employment of the non-inflatable tire, the irregular strains produced by irregular expansion and contraction upon an inflated tire are avoided, which tends to weaken the fabric reinforcement and injure its efficiency, since the amount of internal pressure in the improved tire remains uniform at all times, and never rises above atmospheric pressure.

The invention is illustrated in the accompanying drawings, hereinafter more fully described, and specifically pointed out in the claims.

In the accompanying drawings, Fig. 1 is a transverse section taken on line 1—1 of Fig. 3 of an integral tire and rim, under normal conditions. Fig. 2 is a similar section of the device when compressed by road contact. Fig. 3 is a longitudinal, or circumferential section, showing the arrangement of the radial ribs and inclined webs upon one vertical inner side thereof. Fig. 4 is a transverse section of a tire, composed of inner tube or core and casing. Fig. 5 is a transverse section of the core showing its condition before insertion in the casing.

In these views, in Figs. 1, 2 and 3 A represents a tire having a central longitudinal opening, B, therein, and split longitudinally at C on the rim side. The tire is reinforced by means of fabric layers, D, and breaker strip, E, which enclose the rim edges, F, F, and the beads, G, G, of the tire.

Upon the vertical inner sides of the longitudinal opening B in the tire, are secured the inwardly projecting ribs H which are inclined towards each other to provide oppositely extended V-shaped webs, which point alternately to the tread and rim surfaces of the tire, and are connected at their intersecting points. From these intersecting points radially extending webs or ribs I, I, extend alternately in opposite directions, viz towards the tread and rim sides of the tire.

The vertical inner edges, J, J, of the members on opposite sides of the opening are preferably opposed and closely adjacent to each other, and when the rim edges are enclosed in the flanges, K, K, of the rim, the rim edges are pressed tightly together. The opposed webs or flanges are arranged in zigzag formation, circumferentially about the vertical sides of the tire.

When the tire is subjected to pressure, the vertical inner edges of the webs and ribs are pressed apart, as shown in Fig. 2.

The effect of local pressure, as when the tire rolls over a stone or ridge on the roadway, is shown in Fig. 3.

Here the radial ribs sustain the vertical pressure and tend to absorb the shock, and bend under the effort; also the inclined webs serve as diagonal thrust members to absorb the shock and also to transmit it to the substance of the tire on both sides of the point of impact, thus distributing it widely and relieving the local strain.

In Fig. 4 a separate outer casing, L, is shown, which encloses an inner tube or core, M.

The core is constructed somewhat similarly to the casing shown in Fig. 1, but is without the fabric layers and bead edges. It is originally formed as shown in Fig. 5, with the rim edges, Q, Q, spread apart, so that when compressed to insert into the casing this action will cause the tread side to be pushed outward so as to completely fill the casing.

In Figs. 1 and 2 the tread side of the tire is shown flat at O, and also the tread side of the opening at P, to insure perfect distribution of the pressure over both sides of the tire, so that the ribs and webs on both sides thereof will have the same amount of distortion.

In Figs. 4 and 5, the rim edges of the core are thickened at Q, to enable them to press tightly against the rim edges of the casing.

Having described the invention, what I claim as new and desire to secure by Letters Patent is:

1. In a non-inflatable tire, an annular, resilient body provided with a longitudinal opening therethrough, split centrally and longitudinally on its rim side and having thickened edges, opposed transverse radial ribs extending into the opening in said body from the sides thereof and oppositely inclined transverse webs alternating with said radial ribs, and extending inwardly into said opening from the vertical sides of said body.

2. In a non-inflatable tire, an annular, hollow, resilient body split centrally and longitudinally on its rim side, and having thickened edges, opposed transverse radial ribs extending into the opening in said body, and oppositely inclined transverse webs alternating with said radial ribs, and extending inwardly into said opening from the vertical sides of said body, said ribs extending in opposite directions from the points of intersection of adjoining webs.

In testimony whereof, I hereunto set my hand this 13th day of July, 1922.

HOWARD M. DODGE.